United States Patent [19]

Scharlacken et al.

[11] Patent Number: 4,756,066
[45] Date of Patent: Jul. 12, 1988

[54] END OF ARM TOOLING FOR GEROTOR OIL PUMP ASSEMBLY

[75] Inventors: John W. Scharlacken, Orleans, Mass.; Samuel Bergamo, Metamora, Mich.

[73] Assignee: General Motors Corporation, Detroit, Mich.

[21] Appl. No.: 56,224

[22] Filed: Jun. 1, 1987

[51] Int. Cl.⁴ ............................................. B23P 15/00
[52] U.S. Cl. .............................. 29/156.4 R; 29/33 K; 29/711; 29/791; 294/104; 294/907; 414/736; 901/33; 901/39; 901/46
[58] Field of Search ................ 29/33 K, 156.4 R, 709, 29/711, 712, 714, 791, 822; 294/86.4, 104, 907; 414/736; 901/31, 33, 37, 39, 46

[56] References Cited

U.S. PATENT DOCUMENTS 2,812,972 11/1957 Grapple ............................. 294/104
2,857,195 10/1958 Fischer .............................. 294/104
4,623,183 11/1986 Aomori ............................ 901/39 X

FOREIGN PATENT DOCUMENTS 931653   5/1982 U.S.S.R. ............................ 294/104
1180267  9/1985 U.S.S.R. ........................... 294/86.4
1184791 10/1985 U.S.S.R. ............................ 294/104

Primary Examiner—P. W. Echols
Assistant Examiner—Andrew E. Rawlins
Attorney, Agent, or Firm—Ernest E. Helms

[57] ABSTRACT

The present invention relates to a method and apparatus for inserting the gerotor oil pump assembly into the housing of an engine. The present invention provides a first jaw and a second jaw which allow the gear assembly to be picked up by the robot or the like while at the same time decreasing the possibility of lock up between the primary outer and secondary inner gears of the gerotor assembly.

11 Claims, 3 Drawing Sheets

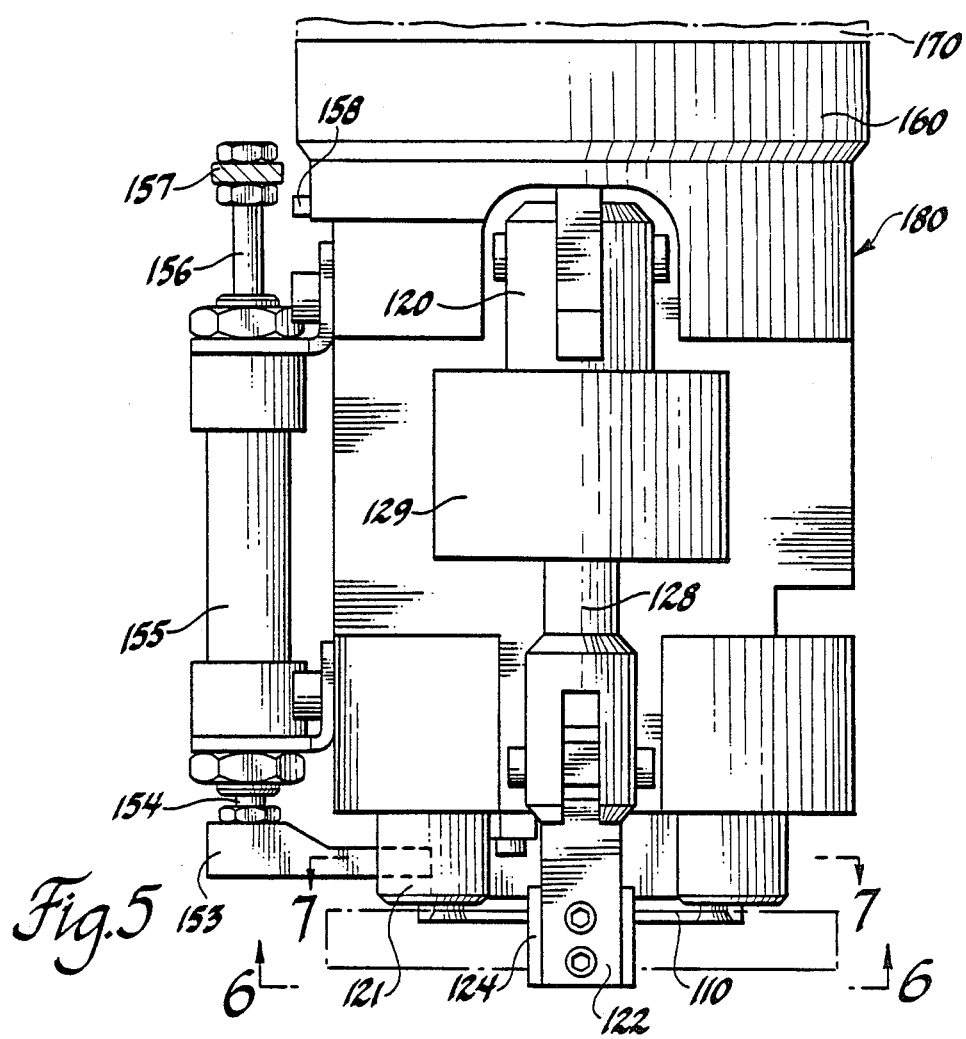
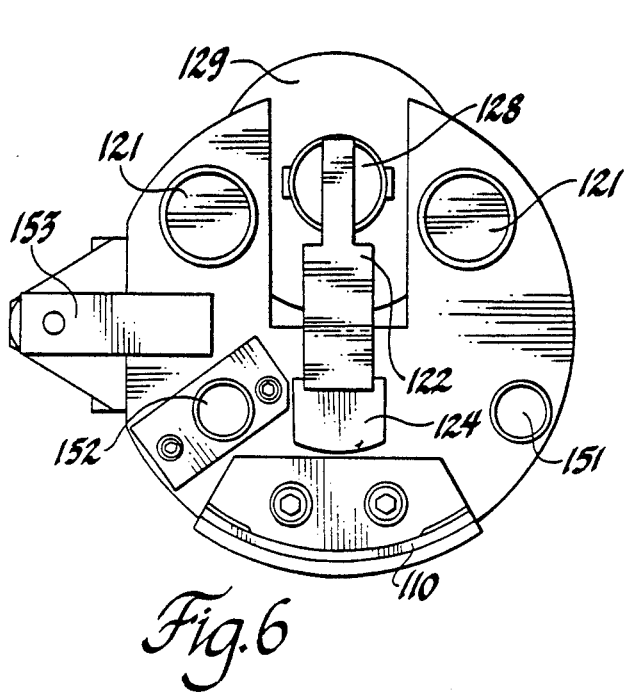
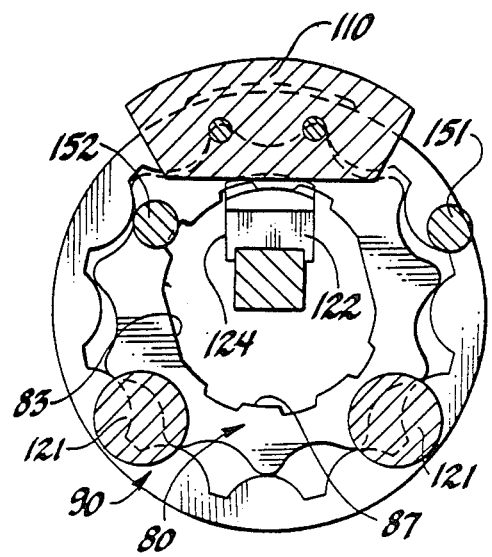

END OF ARM TOOLING FOR GEROTOR OIL PUMP ASSEMBLY

FIELD OF THE INVENTION

The field of the present invention is that of end of arm tooling devices (EOAT) for inserting gerotor oil pump gear assemblies into the gear housing of an engine and methods of utilization of the same.

DISCLOSURE STATEMENT

An oil pump gear assembly includes a secondary or inner ring gear with exterior teeth meshed inside of a primary or outer gear with interior teeth. The primary gear typically has more teeth than the secondary gear. Prior to the present invention, the gear assembly was manually picked up from a cardboard shipping container. The operator would then insert the oil pump gear assembly into the oil pump gear housing of an engine.

The manual method of assembly is sometimes tedious and boring since the operator has to load the gear assembly approximately 220 times an hour. The operator must be constantly alert to prevent improper insertion of the gear assembly to prevent the primary and secondary gears from locking. Prevention of gear lockup was one of the main considerations preventing the installation of oil gear pump assemblies from being automated in the past.

SUMMARY OF THE INVENTION

To overcome the problems associated with manual installation of the gear pump assembly, the present invention is brought forth. The present provides an EOAT and a method allowing a robot or the like to load the gear assembly and install the gear assembly into an engine oil pump housing.

A preferred embodiment of the present inventive EOAT provides two jaws. One jaw has a first finger for picking up the primary gear and a second finger to capture the secondary gear against the primary gear. The second finger has relative movement with the secondary gear, imparting an eccentric rotational movement to the secondary gear, to kick the secondary gear out of possible lockup with the primary gear. An alternate preferred embodiment has a second jaw with a tapered foot which urges the secondary gear upwards to help prevent lockup with the primary gear.

The present invention provides an apparatus and method of utilization of the same of an EOAT for picking up gerotor assemblies.

It is an object of the present invention to provide an EOAT for a robot or the like to load a gerotor oil pump gear assembly including a primary outer gear having first and second sides and a secondary inner gear into an oil pump housing, the EOAT including a frame, a first jaw connected with the frame, the first jaw being adapted to grab a first side of the primary gear, and a second jaw connected with and movable by the frame having first and second fingers, the first finger being adapted to grab the second side of the primary gear and the second finger being adapted to grab and have slight relative movement with the secondary gear whereby relative movement of the first and second jaws towards one another causes the first finger of the second jaw and the first jaw to grab the primary gear and whereby the second finger captures the secondary gear to the first side of the primary gear and impart an eccentric rotational movement to the secondary gear to kick out the secondary gear from possible lock up with the primary gear thereby allowing the robot or the like to grab the gear assembly.

It is an object of the present invention to provide an EOAT for a robot or the like to load a gerotor oil pump gear assembly including primary outer gear and a secondary inner gear into an oil pump housing of an engine, said inner gear having an inner diameter with a significant portion having a radius of curvature less than a first predetermined value, said EOAT including a longitudinally extending frame, first and second sensors connected with the frame for detecting the presence of the primary and the secondary gears, a first jaw fixably connected with the frame, the first jaw being adapted to grab the primary gear, a second jaw pivotally connected with the frame and also pivotally connected with a cylinder actuated piston rod longitudinally mounted to the frame, and the second jaw having a foot with a tapered surface with respect to the secondary gear inner diameter, the tapered foot having a radius of curvature equal to the first predetermined value adapted to grab and urge the secondary gear upward whereby relative movement of the second jaw towards the first jaw causes the second jaw to capture the secondary gear to the primary gear and imparts an eccentric rotational movement to the secondary gear to kick out the secondary gear from possible lock up with the primary gear thereby allowing the robot or the like to grab the gear assembly, and means to sense the location of the gear assembly whereby the proper loading of the gear assembly within the gear housing is confirmed.

It is an object of the present invention to provide a method of using a robot or the like to load a gerotor oil pump gear assembly including a primary outer gear and a secondary inner gear with an inner diameter to an oil pump housing utilizing an EOAT gripper, the method including, connecting with the EOAT gripper a first jaw and a second jaw having a tapered foot, grabbing the primary gear with the first jaw, grabbing and urging upwards the interior diameter of the secondary gear with the tapered foot of the second jaw, and capturing the secondary gear to the primary gear with the second jaw foot whereby the tapered foot imparts in an eccentric rotational movement to the secondary gear to kick out the secondary gear from possible lock up with the primary gear allowing the robot or the like to grab the gear assembly.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 5 is a front sectional view mainly in front elevation of the EOAT of FIG. 4; and FIGS. 6 and 7 are views taken along lines 6—6 and 7—7 of FIG. 5.

DETAILED DESCRIPTION OF THE DRAWINGS

Figure 1:
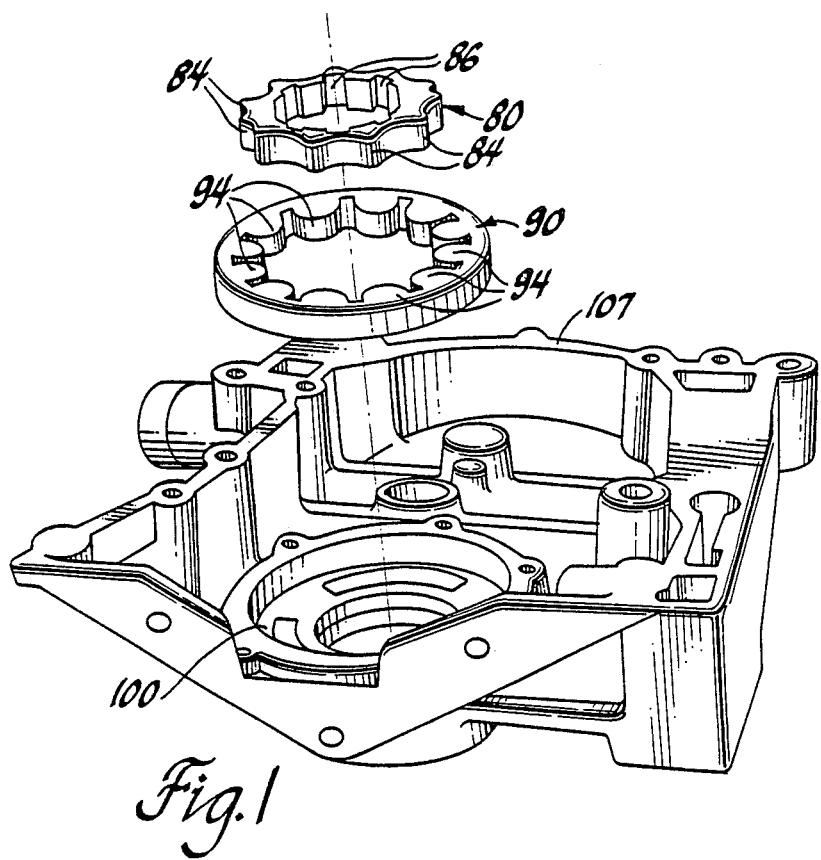
FIG. 1 is a perspective view illustrating the installation of the gerotor oil pump gear assembly into an oil pump housing in the front cover of an engine.

Referring to FIG. 1, the gerotor oil pump gear assembly has two parts. An outer primary gear 90 has a series of inward facing teeth 94 along an inner diameter. Mounted inside the primary gear 90 is an inner secondary gear 80. The secondary gear 80 has a series of exterior teeth 84 typically being a number less than the number of teeth of the primary gear 90. The secondary gear 80 also has a series of notches 86 along an inner diameter allowing the secondary gear 80 to have a spline type connection with a shaft (not shown) of the engine.

Figure 2:
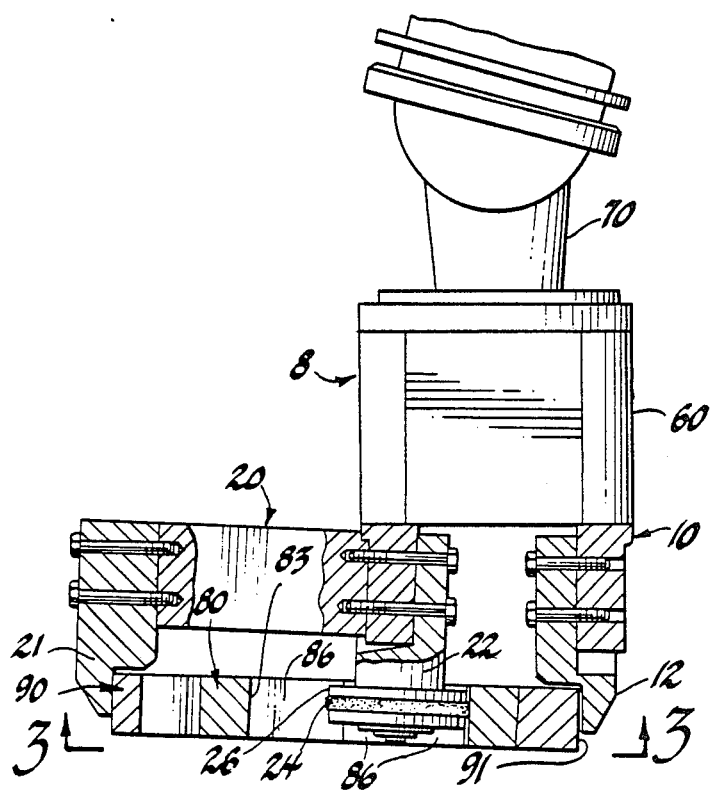
FIG. 2 is a front sectional view with portions in front elevation of a preferred embodiment EOAT of the present invention.
Figure 3:
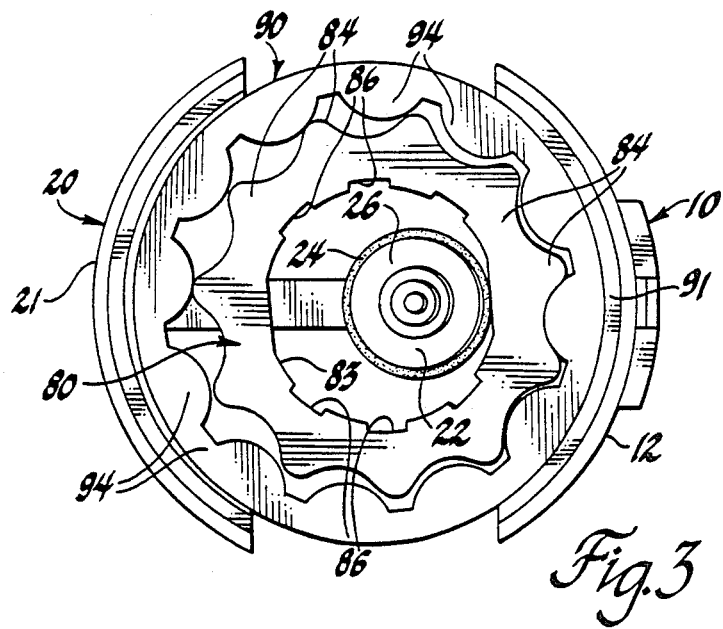
FIG. 3 is a view taken along line 3—3 of FIG. 2.
Figure 4:
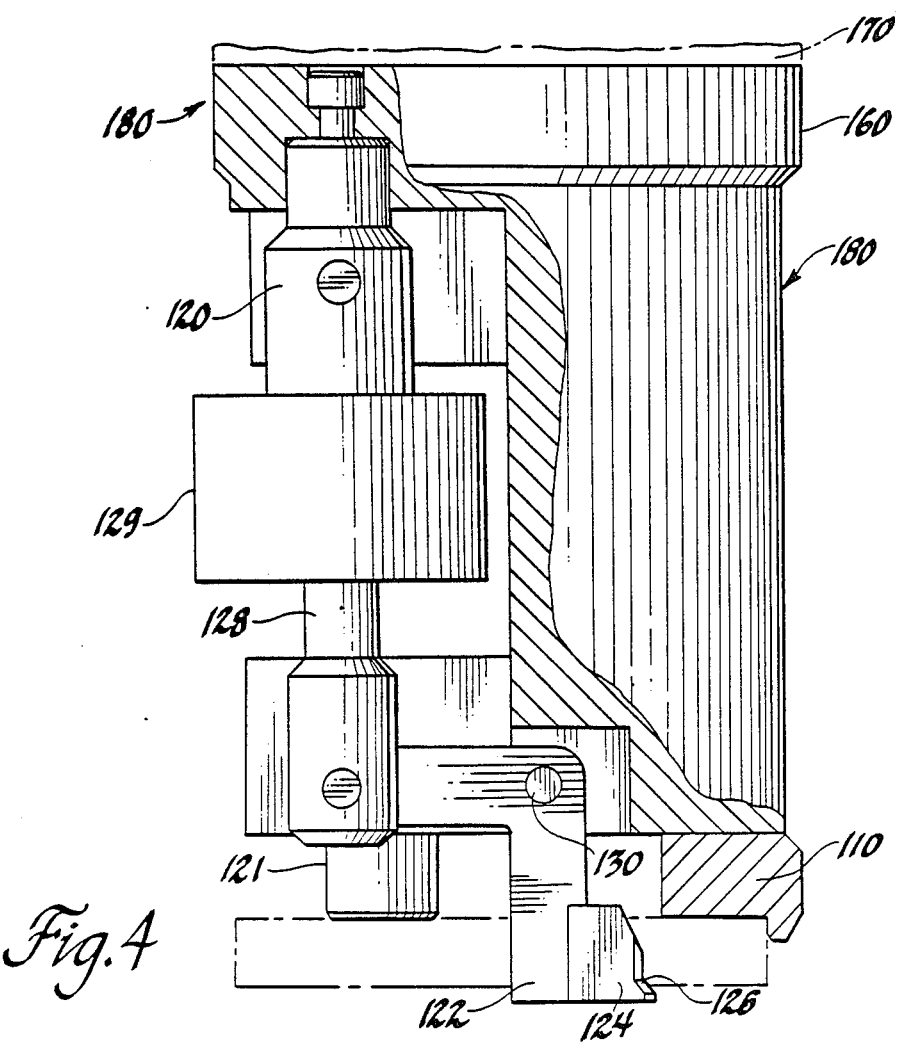
FIG. 4 is a side sectional view with portions in side elevation of an alternate preferred embodiment EOAT of the present invention.

Referring additionally to FIGS. 2 and 3, an EOAT 8 of the present invention has three major parts. The first major part is an EOAT gripper actuator frame 60 which may be a scissors or parallel motion type gripper. The second major part is a first jaw 10 which is connected with and moved by the gripper frame 60. The third major part of the inventive EOAT 8 is the second jaw 20 which has first and second fingers 21 and 22. The second jaw 20 is also connected with and moved by the frame 60.

The first jaw 10 has boltedly connected thereto a moon 12 adapted for engaging and grabbing a first side 91 of the primary gear 90. The first jaw 10 can easily be adjusted for primary gears 90 of different dimensions by simple substitution of the moon 12.

The first finger 21 is moon shaped and is boltably attached to the second jaw 20. The first finger 21 is adapted to grab a second side 92 of the primary gear 90.

When the gears arrive in their shipping package, the secondary gear 80 is typically placed within the primary gear 90. Sometimes the secondary gear 80 is located in such a manner that it tends to be locked, by having one or more teeth 84 cammed in direct contact with the tooth (or teeth) 94 of the primary gear 90. In other words, the secondary gear 80 will be locked from rotation with the primary gear 90. To properly pick up and load the primary and secondary gears 80 and 90 as a set, the secondary gear 80 should be kicked out of possible locking relationships.

The second jaw 20 also has attached thereto the second finger 22. The second finger has a roller 26. For contact with the interior diameter 83 of the secondary gear 80, the roller 26 has a hard rubber O-ring 24. The roller 26 is allowed to have slight relative movement with the interior diameter 83 of secondary gear 80. When there is relative movement between the first 10 and second 20 jaws, the second finger 22 captures the secondary gear 80 against the first side 91 of the primary gear 90. The rotative relative movement of the roller 26 imparts an eccentric rotational movement to secondary gear 80. If the secondary gear 80 is in a locking relationship with the primary gear 90, the imparted eccentric rotational movement will cause secondary gear 80 to be kicked out from the locking relationship.

In operation the first 10 and second 20 jaws will be spread apart. The robot 70 or the like will place the EOAT 8 to a position wherein the second finger 22 is inserted within the secondary gear inner diameter 83. Upon closure of the first 10 and second 20 jaws by the frame 60 in a scissors or parallel motion, the first finger 21 and the first jaw 10 will grab the outside of the primary gear 90. Simultaneously the second finger 22 will capture the secondary gear 80 against the primary gear 90 and the relative motion between the roller 26 and the secondary gear inner diameter 83 will kick out the secondary gear 80 from locked positions.

Referring to FIGS. 4–7, there is provided an alternate preferred embodiment EOAT 180 of the present invention. The EOAT 180 has an elongated frame 160 connected with the robot or the like 170. Opposite the robot there is connected a fixed first jaw 110 adapted for grabbing the primary gear 90.

EOAT 180 also has a second jaw 122 which is pivotably attached with the frame 160 by pin 130. Second jaw 122 is also pivotally attached with piston rod 128. Piston rod 128 is actuated by cylinder 129 which is in turn mounted longitudinally on frame 160 by mounting pin 120.

The second jaw 122 has a foot 124 with a tapered surface 126. The tapered surface 126 has a radius of curvature of a first value. The first value radius of curvature will be greater than the radius of curvature of a portion 87 of the interior diameter 83 of the secondary gear 80 (FIG. 7).

In operation, piston rod 128 is retracted within the cylinder 129. The EOAT 180 inserts the second jaw 122 into the interior diameter 83 of the secondary gear 80. Activation of the cylinder 129 will cause the piston rod 128 to be extended downward pivoting foot 124 to a position to capture the secondary gear 80 against the primary gear 90. Because of tapered surface 126, the secondary gear 80 is urged upwards. The upward movement imparted by the tapered surface 126 has several advantages. The first advantage is that the secondary gear 80 is captured to the primary gear 90 in both the vertical and horizontal planes providing a firmer grip. The foot 124 will typically have contact along two separate points on tapered surface 126 with the interior diameter 83 of the secondary gear. If gear 80 is in a position of lock up with gear 90, one point of tapered surface 126 typically will come in contact prior to the contact of the second point. The first point of contact and the lifting action previously described will cause an impartation of an eccentric rotational movement to the secondary gear 80 causing the secondary gear 80 to be kicked out of lock up with the primary gear 90. After the foot 124 comes into a second point of contact with the interior diameter 83, the curvature of tapered surface 126 tends to cause continual relative movement until the secondary gear 80 is in an optimum position farthest away from possible lock up with primary gear 90.

Fixably connected with frame 160 are two studs 121 which rest on top of both the primary 90 and secondary 80 gears to assure their proper placement within the oil pump gear housing 100 of the engine front cover 107.

The EOAT 180 also has connected with the frame two sensors 152 and 151 which are utilized in confirmation that the primary 90 and secondary 80 gears are available when the EOAT 180 is placed into a position to initially pick up the primary and second gears 90 and 80 from the shipping package (not shown).

There is also provided a foot 153 connected with piston rod 154 which is in turn connected with piston rod 156 and cylinder actuator 155. Upon the loading of the primary 90 and secondary 80 gears into the gear housing 100 the cylinder actuator 155 extends foot 153 downward to confirm the proper placement of the first and second 90 and 80 gears into the gear housing 100. If the gear housing 100 has been improperly machined the gears will not sit into the gear housing 100 and foot 153 will not be able to go fully downward. This will prevent washer 157 from being picked up by proximity sensor 158 thereby allowing the EOAT to notify the robotic or the like controller that the assembly of the gears into the engine gear housing 100 has been unsuccessful.

The present invention provides a method of using a robot 170 or the like to load a gerotor oil pump gear assembly including a primary outer 90 gear and a secondary inner 80 gear with an inner diameter 83 to an oil pump housing 100 utilizing an EOAT 180 gripper, the method including the following steps:

1. Connecting with the EOAT gripper 180 a first jaw 110 and a second jaw 122 having a tapered 126 foot 124;

2. Grabbing the primary 90 gear with the first jaw 110;

3. Grabbing and urging upwards the interior diameter 83 of the secondary 80 gear with the tapered 126 foot 124 of the second jaw 122; and 4. Capturing the secondary 80 gear to the primary 90 gear with the second jaw foot 124 whereby the tapered 126 foot 124 imparts in an eccentric rotational movement to the secondary 80 gear to kick out the secondary 80 gear from possible lock up with the primary 90 gear allowing the robot 120 or the like to grab the gear assembly.

While a few embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An end of arm tooling device (EOAT) for a robot or the like to load a gerotor oil pump gear assembly including a primary outer gear having first and second sides and a secondary inner gear into an oil pump housing, said EOAT comprising in combination:

a frame;

a first jaw connected with said frame, said first jaw being adapted to grab a first side of said primary gear; and a second jaw connected with and movably by said frame having first and second fingers, said first finger being adapted to grab said second side of said primary gear and said second finger being adapted to grab and have slight relative movement with said secondary gear whereby relative movement of said first and second jaws towards one another causes said first finger of said second jaw and said first jaw to grab said primary gear and whereby said second finger captures said secondary gear to said first side of said primary gear and imparts an eccentric rotational movement to said secondary gear to kick out said secondary gear from possible lock up with said primary gear thereby allowing said robot or the like to grab said gear assembly.

2. An end of arm tooling device (EOAT) as described in claim 1 wherein said second finger has mounted thereto a roller for capturing said secondary gear to said primary gear.

3. An end of arm tooling device (EOAT) for a robot or the like to load a gerotor oil pump gear assembly including a primary outer gear having first and second sides and interior teeth of a first number, and a secondary inner gear having exterior teeth of a second number into an oil pump housing, said EOAT comprising in combination;

a gripper frame;

a first jaw connected with and movable by said gripper frame, said first jaw having a moon shaped end adapted to grab a first side of said primary gear; and a second jaw conected with and movable by said gripper frame having a first finger with a moon shaped end being adapted to grab said second side of said primary gear and said second jaw also having a second finger with a rotatably mounted roller adapted to grab and have slight rotative movement with said secondary gear whereby relative movement of said first and second jaws towards one another causes said first jaw and said first finger of said second jaw to grab said primary gear and whereby said second finger roller captures said secondary gear to said first side of said primary gear and imparts an eccentric rotational movement to said seocndary gear to kick out said secondary gear from possible lockup with said primary gear thereby allowing said robot or the like to grab said gear assembly.

4. A method of using a robot or the like to load a gerotor oil pump gear assembly including a primary outer gear having first and second sides and a secondary inner gear into an oil pump housing utilizing an end of arm tooling device (EOAT) gripper, said method in combination comprising:

connecting with said EOAT gripper a first jaw, and a second jaw having two fingers;

grabbing a first side of the primary gear with said first jaw;

grabbing said second side of the primary gear with said first finger of said second jaw;

capturing said secondary gear to said first side of said primary gear with said second finger of said second jaw;

relatively moving said second finger with said secondary gear whereby said second finger imparts an eccentric rotational movement to said secondary gear to kick out said secondary gear from possible lock ups with said primary gear allowing said robot or the like to grab said gear assembly.

5. An end of arm tooling device (EOAT) for a robot or the like to load a gerotor oil pump gear assembly including a primary outer gear and a secondary inner gear into an oil pump housing of an engine, said inner gear having an inner diameter, said EOAT comprising in combination:

a frame;

a first jaw connected with said frame, said first jaw being adapted to grab said primary gear; and a second jaw connected with and movable by said frame having a foot with a tapered surface with respect to said secondary gear inner diameter adapted to grab and urge said secondary gear upwards, whereby relative movement of said first and second jaws towards one another causes said second jaw to capture said secondary gear to said primary gear thereby allowing said robot or the like to grab said gear assembly.

6. An end of arm tooling device (EOAT) for a robot or the like to load a gerotor oil pump gear assembly including a primary outer gear and a secondary inner gear into an oil pump housing of an engine, said inner gear having an inner diameter with a portion having a radius of curvature less than a first value, said EOAT comprising in combination:
- a frame;
- a first jaw connected with said frame, said first jaw being adapted to grab said primary gear; and
- a second jaw connected with and movable by said frame having a foot with a tapered surface with respect to said secondary gear inner diameter with a radius of curvature equal to said first value adapted to grab and urge said secondary gear upward whereby relative movement of said first and second jaw towards one another causes said second jaw to capture said secondary gear to said primary gear and said foot imparts an eccentric rotational movement to said secondary gear to kick out said secondary gear from possible lock up with said primary gear thereby allowing said robot or the like to grab said gear assembly.

7. An end of arm tooling device (EOAT) as described in claim 5 having a generally elongated frame and said second jaw being pivotally connected with said frame and said second jaw being pivotably connected with a cylinder actuated piston rod extending longitudinally along said frame.

8. An EOAT as described in claim 5 further including a sensor to determine the presence of at least one of said primary or secondary gears.

9. An EOAT as described in claim 5 further including means to confirm the loading of said gear assembly into said oil pump housing.

10. An end of arm tooling device (EOAT) for a robot or the like to load a gerotor oil pump gear assembly including primary outer gear and a secondary inner gear into an oil pump housing of an engine, said inner gear having an inner diameter with a portion having a radius of curvature less than a first value, said EOAT comprising in combination:
- a longitudinally extending frame;
- first and second sensors connected with said frame for detecting the pesence of said primary and said secondary gears;
- a first jaw fixably connected with said frame, said first jaw being adapted to grab said primary gear;
- a second jaw pivotally connected with said frame and also pivotally connected with a cylinder actuated piston rod longitudinally mounted to said frame; and
- said second jaw having a foot with a tapered surface with respect to said secondary gear inner diameter, said tapered foot having a radius of curvature equal to said first value adapted to grab and urge said secondary gear upward whereby relative movement of said second jaw towards said first jaw causes said second jaw to capture said secondary gear to said primary gear and impart an eccentric rotational movement to said secondary gear to kick out said secondary gear from possible lock up with said primary gear thereby allowing said robot or the like to grab said gear assembly; and
- means to sense the location of said gear assembly whereby the proper loading of said gear assembly within said gear housing is confirmed.

11. A method of using a robot or the like to load a gerotor oil pump gear assembly including a primary outer gear and a secondary inner gear with an inner diameer to an oil pump housing utilizing an end of arm tooling device (EOAT) gripper, said method in combination comprising:
- conecting with said EOAT gripper a first jaw and a second jaw haing a tapered foot;
- grabbing said primary gear with said first jaw;
- grabbing and urging upwards said interior diameter of said secondary gear with said tapered foot of said second jaw; and
- capturing said secondary gear to said primary gear with said second jaw foot whereby said tapered foot imparts in an eccentric rotational movement to said second gear to kick out said secondary gear from possible lock up with said primary gear allowing said robot or the like to grab said gear assembly.

* * * * *